(12) United States Patent
Rao

(10) Patent No.: US 8,918,092 B2
(45) Date of Patent: Dec. 23, 2014

(54) SYSTEM FOR MANAGING SOCIAL GROUP INTERACTIONS

(76) Inventor: Bindu Rama Rao, Laguna Niguel, CA (US)

( * ) Notice: Subject to any disclaimer, the term of this patent is extended or adjusted under 35 U.S.C. 154(b) by 836 days.

(21) Appl. No.: 13/170,644

(22) Filed: Jun. 28, 2011

(65) Prior Publication Data

US 2011/0258275 A1   Oct. 20, 2011

Related U.S. Application Data

(63) Continuation-in-part of application No. 12/221,876, filed on Aug. 6, 2008.

(51) Int. Cl.
*H04M 3/493* (2006.01)
*G06F 17/30* (2006.01)
*G06Q 10/10* (2012.01)
*H04L 12/58* (2006.01)
*H04M 3/487* (2006.01)

(52) U.S. Cl.
CPC ......... *H04M 3/493* (2013.01); *G06F 17/30707* (2013.01); *G06F 17/30867* (2013.01); *G06Q 10/10* (2013.01); *H04L 12/588* (2013.01); *H04L 51/32* (2013.01); *H04M 3/4878* (2013.01)

USPC ............... 455/419; 455/404.1; 455/412.1; 455/420; 455/456.1; 455/552.1; 455/517; 455/422.1

(58) Field of Classification Search
CPC ... G06Q 20/223; G06Q 20/32; G06Q 20/363; H04M 3/493; H04M 2203/2044; H04M 2203/558; H04M 2203/559; H04M 1/72547; G06F 19/3418; H04L 12/185; H04L 12/588; H04L 12/5865; H04L 12/5895; H04L 51/02
USPC ............. 455/412.1, 414.1, 419, 550.1, 552.1; 709/246, 217, 218, 219, 201, 203, 226
See application file for complete search history.

(56) References Cited

U.S. PATENT DOCUMENTS 6,591,300 B1 * 7/2003 Yurkovic ...................... 709/226

* cited by examiner

*Primary Examiner* — Babar Sarwar

(57) ABSTRACT

A system for managing social group interactions comprising a server that supports creation and management of a plurality of social groups and a plurality of user devices communicatively coupled to the server that is used by a plurality of users. The server supports the registration of each of the plurality of users as members of one or more of the plurality of social groups. The server saves a list of the plurality of social groups in which the one of the plurality of users is currently a member at the one of the plurality of user devices associated with the one of the plurality of users. For example, if a user using the user device is associated with a social group (where he is a member), then the server saves a reference and membership details and even a member list in the user device.

19 Claims, 3 Drawing Sheets

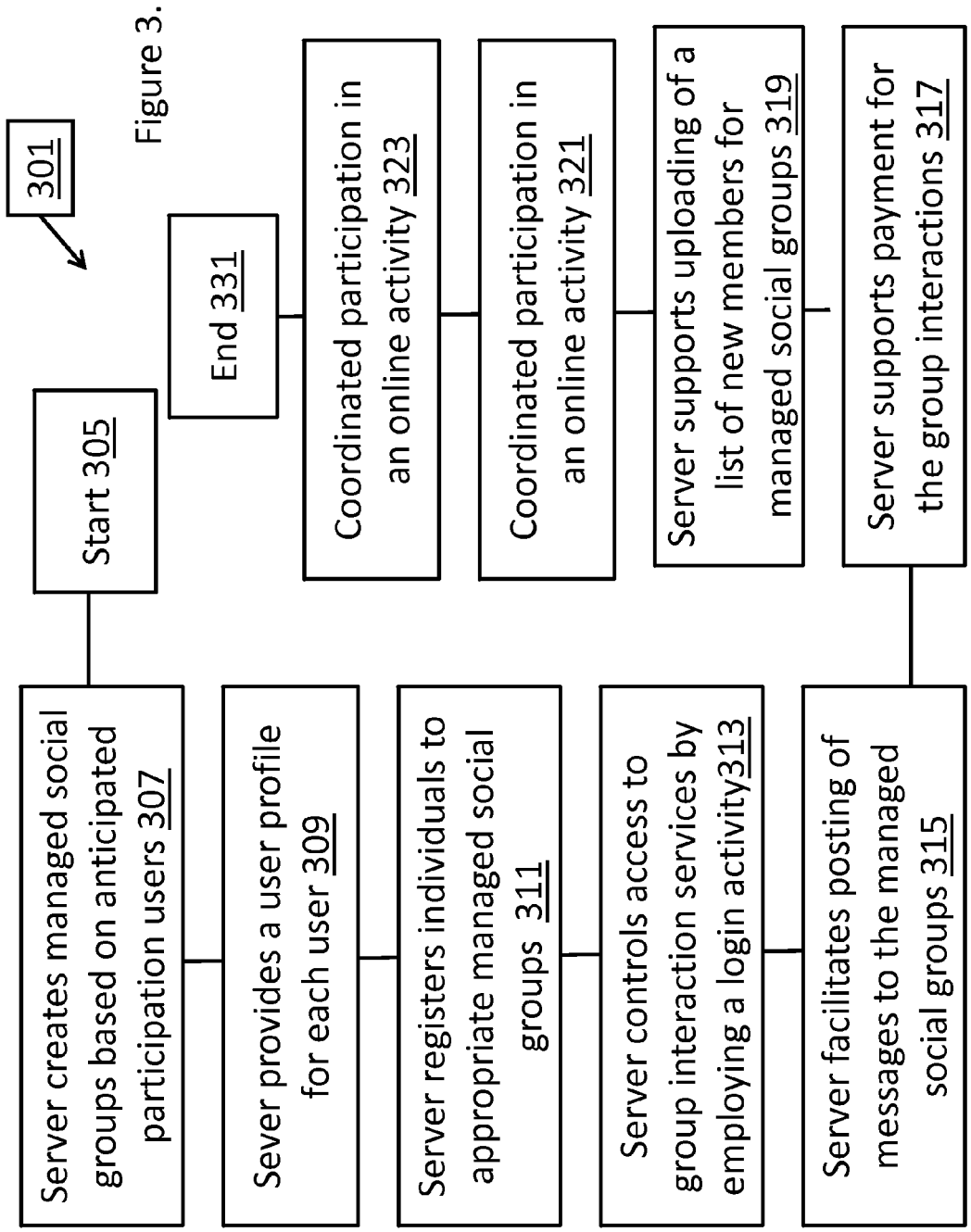

SYSTEM FOR MANAGING SOCIAL GROUP INTERACTIONS

CROSS REFERENCES TO RELATED APPLICATIONS

The present patent application is a continuation-in-part of, claims priority to, and makes reference to U.S. non-provisional patent Ser. No. 12/221,876, entitled "Mobile device for access to agricultural services by non-literate and semi-literate users", filed on Aug. 6, 2008. The complete subject matter of the above-referenced United States Patent Application is hereby incorporated herein by reference, in its entirety.

The present patent application is based on and makes reference to United States non-provisional patent entitled QUESTIONNAIRE SERVER CAPABLE OF PROVIDING QUESTIONNAIRES BASED ON DEVICE CAPABILITIES, Ser. No. 11/807,672, filed May 30, 2007, which in turn is based on a U.S. provisional patent application Ser. No. 60/858,546, filed on Nov. 13, 2006. The complete subject matter of this referenced United States Patent Application is hereby incorporated herein by reference, in its entirety.

The present patent application is based on and makes reference to United States non-provisional patent entitled MOBILE WEB SYSTEM PROVIDING INTERCHANGEABLE SERVICE WITH A MOBILE DEVICE, Ser. No. 12/011,238, filed Jan. 25, 2008, which in turn is based on U.S. non-provisional patent, Ser. No. 11/807,670, entitled "MOBILE DEVICE AND SERVER CAPABLE OF SUPPORTING ADHOC QUESTIONNAIRES", filed on May 30, 2007. The complete subject matter of the above-referenced U.S. patent application is hereby incorporated herein by reference, in its entirety.

BACKGROUND

1. Technical Field

This present invention relates generally to social group interactions and more particularly to a system for managing social group interactions.

2. Related Art

In the last few years, Internet technologies have proliferated and millions of people use the Internet for business and for personal activities. In addition, social networks have taken off wherein a number of people can communicate with each other using Internet based systems such as Facebook.

There are several unmet needs for users who want to use social media for business purposes. There is need for social groups that can be managed, with proper control over who can conduct specific activities, but such social networks do not yet exists.

A lot is being made of the power of social networks such as Facebooks. However most of the buzz seems to be around games people can play on Facebook, or the ability of a person making his friends read the messages that person posts, and photos that person posts, on his social network account.

There is a problem with the way hundreds of messages posted on a user's account in a social network website is presented, and the clutter that is presents to a viewer. Such clutter would be inappropriate to a user using a mobile device to access his account at the social network website.

There is a problem with the way social network websites are designed, in that they are designed primarily for teenagers and young individuals to post their photos, their ideas, their likes and dislikes and their opinions. These are not designed for group interactions. They are more appropriate for "venting ones spleen" or for expressing unsolicited opinions.

Currently, enterprises and businesses cannot make adhoc groups for their employees wherein specific work capabilities can be provided to such adhoc groups. This is another serious need in the market but does not yet exist.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 3 is a flow chart of an exemplary operation conducted by a server in managing interaction in social groups supported by the server.

DETAILED DESCRIPTION OF THE DRAWINGS

Figure 1:
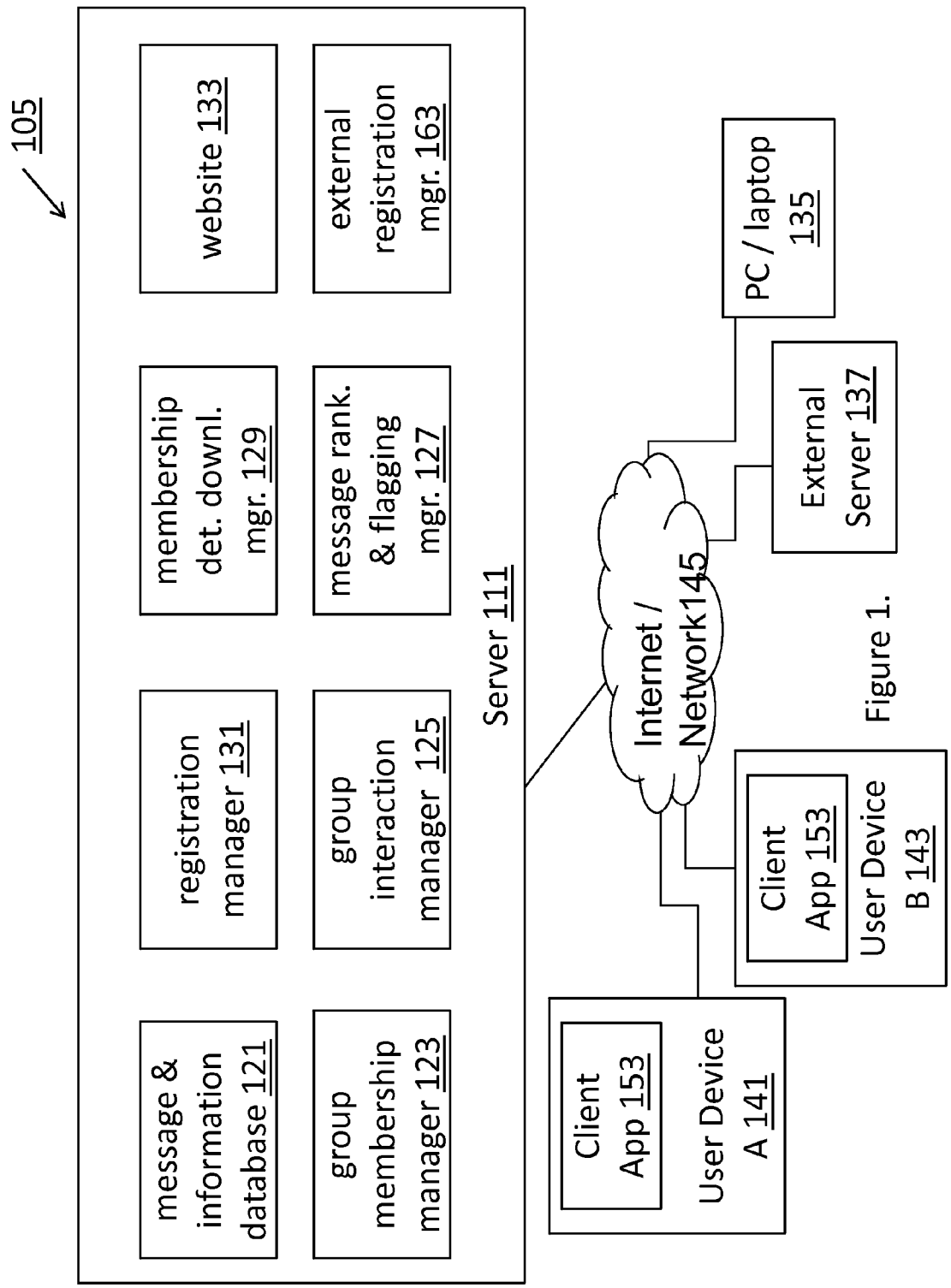
FIG. 1 is a perspective block diagram of a system for managing social group interactions that facilitates communications between individuals who belong to social groups, wherein the social groups are adhoc groups or groups of registered members.

FIG. 1 is a perspective block diagram of a system for managing social group interactions 105 that facilitates communications between individuals who belong to social groups, wherein the social groups are adhoc groups or groups of registered members. The system 105 comprises a plurality of user devices, wherein each of the plurality of user devices 141, 143 (such as mobile devices, tablets, laptops, etc.) is employed by one of a plurality of members, and a server 111. The server 111 is communicatively coupled to the plurality of user devices 141, 143 over Internet/network 145.

The server 111 supports social group interactions and it comprises a group membership manager 123 that facilitates creation of a plurality of social groups and the management of the members of the plurality of social groups, wherein each of the plurality of social groups can be assigned one or more group managers. A group manager is an individual who is a manager of a social group and is responsible to handle questions from one or more members of the corresponding social group. The server 111 also comprises a registration manager 131 that manages a member profile for members of the plurality of social groups, and a group interaction manager 125 that manages interaction by members of the plurality of social groups employing their corresponding user devices 141, 143, wherein the corresponding user devices 141, 143 are communicatively coupled to the server 111, and wherein each of the plurality of social groups are assigned an associated social group interaction type. For example group interaction types can be peer-to-peer (P2P) or managed groups.

The group interaction manager 125 manages one-to-one interactions and one-to-many interactions within each of the plurality of social groups, wherein the interactions comprise sending and receiving messages by the members of the each of the plurality of social groups. It also manages creation and dissemination of responses by the recipients of the messages communicated in the one-to-one interactions and the one-to-many interactions within each of the plurality of social groups. It facilitates a default mode communication of a new message by one member of one of a plurality of social groups to all the other members of the one of a plurality of social groups when the group interaction type associated with the one of a plurality of social groups is a peer-to-peer group. The group interaction manager facilitates another default mode communication of a new message by one member of one of a plurality of social groups to only the group managers of the one of a plurality of social groups, when the group interaction type associated with the one of a plurality of social groups is managed group and the user type associated with the one member is regular (i.e. the user is not a manager of the managed group, rather a regular user). User types associated with members can be regular (sometimes referred to as Normal), manager, observer, etc.

The group interaction manager 125 facilitates communication of a new message by one member of one of a plurality of social groups to all the members of the one of the same social groups when the group interaction type associated with that social group is managed group and the user type associated with the one member is manager. Thus a manager of a managed group can post a new message to all the members, while regular members of a managed group can only post to the one or more managers of that social group.

In general, the new message posted by a member of a social group and any response to the new message posted by a recipient or recipients comprises at least one of a textual component, an audio component, a digital image component, a video component, a GPS coordinate component, an IP address component, a sales offer, a security information and an encrypted secure data.

The group interaction manager 125 facilitates creation and sharing of a response message, referencing the new message in the response, wherein the response is provided by one of the other members of the one of a plurality of social groups, in response to the new message by the one member. For example, if a member of a social group sends a new message, any of the other members receiving it can respond to it in a P2P social group. In the case of a managed social group, responses by regular members to a new message from an administrator or manager of the managed social group is received only by the managers one or more available).

The group interaction manager 125 also facilitates forwarding of the new message by one of the other members of the one of a plurality of social groups to another one of the plurality of social groups, in response to the new message sent by the one member. Thus a manager, for example, of one of the social groups, can forward a new message received, to another social group, or to the manager of another social group. This is possible, for example, in one embodiment, if the manager of the first social group is an observer of a second social group.

The server 111 supports creation of adhoc social groups and interaction in such groups. The group interaction manager 125 facilitates creation of such adhoc social groups and interaction between members of the adhoc social groups. Adhoc groups are formed by a user when the user selects a list of individuals (at the server 111 using a browser or using a mobile client on the mobile user device 141 for example) and uploads it or saves it at the server 111 and provides a name or an id and a type for that group. Other ways to make adhoc groups are also contemplated.

In general, each of the plurality of social groups comprise one or more members, each of the one or more members have a corresponding profile registered with the server 111. It also comprises a group name, at least one group manager identification, an optional region identification, a group category identifying a vertical market or a business category and an optional organization affiliation. The group interaction type, can be peer-to-peer or managed. Other interaction types are also contemplated.

The group membership manager 123 manages the membership data of the plurality of social groups, wherein the members of the plurality of social groups are assigned a member type for each of the plurality of social groups in which they are members, wherein the member type is one of an admin, group manager, regular member and observer (other member types are also contemplated, such as admin). The member profile managed by the registration manager 131 for members of the plurality of social groups comprises a contact information (address, phone number, email address, etc.) and a user type indicating a role, wherein the role comprises an admin role and a normal user role. It also comprises a subscription type that is one of a prepaid, post paid and other subscription type, a status that is one of active, inactive and closed, and a receiving mode indicating web access, mobile based access and other types of access to messages.

In one embodiment, the registration manager stores a copy of the member profile for members of the plurality of social groups in their corresponding user devices or in a corresponding secure storage unit, along with a list of those of the plurality of social groups in which the member is a member. For example, in one embodiment, the user device A 141 is a mobile device and the registration manager stores a copy of the member profile stores it in the mobile device 141. In a related embodiment, stores a copy of the member profile in a SIM card associated with the mobile device 141. In yet another embodiment, the registration manager 131 stores a copy of the member profile in a removable storage unit (such as a memory stick) currently communicatively coupled to (such as being plugged into) the user device 141.

In one embodiment, the user devices 141 is one of a TV, a personal computer, a set-top-box, a gaming console, a mobile phone, a tablet device, a media server and a WiFi (802.11 a/b/g/n/based) router.

In general, the server 111 stores, categories and manages messages that are flagged as recommendations by members of the plurality of social groups. Thus users receiving a message in a social group can flag the message is important, as recommended, as useful, etc. They can also rate those messages on a scale, such as on a scale of 1 to 10.

The server 111 also comprises a membership detail download manager 129 that makes it possible for a user to download onto the user device 141 all details of the social groups that user is a member in and other details of his profile, etc. It also comprises a message ranking and flagging manager 127 that helps a user rank messages or flag them as important, etc., a website 133 for remote access using a browser, and an external registration manager 163 for accessing details of user registrations in external social networks and servers, as necessary.

In one embodiment, when a user logs in to server 111 from his user device, the server 111 retrieves a list of groups that the user is currently a member in, and send that list of groups (along with associated summary information such as max number of recent/unread messages, etc.) to save in the user device 141, often sent to the client app 153 in the user device 141, such that list of groups and associated data is accessible by a client app 153 in the user device that communicates with the server 111. The server 111 also sends group type (P2P or managed) for all these groups in the list of groups, along with some user account details such as an user identification, subscription summary, etc. The server 111 also sends determines and sends a member type for each of the groups where user is a member—so that client app 153 can determine if user if a manager or an ordinary member or observer, without having to contact the server 111.

The server 111 also sends a user category (advanced, normal) to the user device 141 along with the list of groups. Typically, when the user first uses the client app 153 in the user device 141 to access the group interaction services provided by the server 111, login information is collected (username, password, for example, or just the username in some cases) and sent to the server 111 by the user device 141. In response, the server determines a list of groups that the user is a member of, along with user profile information and other related data and sends it to the user device 141, where it is selectively saved for use during subsequent sessions when the user logins are conducted locally in the user device 141 (by the client app 153 for example). The server 111 sends a user category (advanced user, normal user, etc.), membership type of the user in the various social groups (manager, normal member, observer, etc.), group type (P2P, managed group, etc.) and other related information that is stored in the user device 141. The client app 153 in the user device 141 determines if user is an advanced user or normal user and provides appropriate user interaction screens in one embodiment. This helps reduce screens or buttons for normal users that advanced users may prefer to use. Not all client app 153 features may not be needed all the time to all the users and user category helps selectively provide client side functionality to some users.

The server 111 needs to determine recipients for posted messages. For example, it needs to determine if recipient for a newly posted message is a social group or an individual member of that social group. It bases such determination (in one embodiment) on a group policy that may be specified. Such group policies (saved in the message & information database 121 in the server 111) if any, which takes into account a member type associated with individual members in a given social group. For example, a table called "list_user" or "group_user" in the message & information database 121 provides a field called member type (list_user.member_type field) that can specify the member type (Manager, Normal, Observer) for a specific user in a specific social group. The same user may have different member types in different social groups.

If there is no policy records set for a specific member type in a specific social group for a specific user operation (such as posting message, deleting message, forwarding message, etc.) default behavior is implemented. Such default behavior can be social group specific. For example, in one social group, based on the social group type (P2P or managed groups), a default behavior is implemented wherein manager messages are sent to whole group and normal user messages are sent only to managers.

In one embodiment, when the social group type is P2P, a new message posted by normal users and observers in that social group is sent to all the members/users in that social group, unless a recipient list is included by sender, in which case only the members included in the recipient list (collected by the user on the user device 141 for example) are sent the new message when it is posted.

In one embodiment, when the social group type is managed group a new message posted in that social group is sent to one or more managers of that group, unless the manager is the sender, in which case it goes to all the members of that social group.

The members of the social group are also provided with a user type (Admin, Normal) that determines if the users can use the website 133 of the server 111 to create messages for posting, manage social group members, review messages, etc. This user type is different from the user category used to determine client side behavior (in the user device 141 for example) wherein the user experience (screens used and prompts provided, etc.) is different for advanced user from those provided to a normal user.

For each social group, a user/member may have manager privileges or ordinary user privileges or observer status. Thus, this member type information (provided for a user for each social group) is used on client side or the server side to determine if user is a manager who can post to all members in a managed group, or an ordinary member who can post only to a manager (or managers).

Typically in a peer-to-peer type social group (P2P), where any member can post to everyone, the recipient for messages is the whole group by default, unless the user decides to send the new message (or a response) to a subset of the members by selecting a list of individual members (on the user device 141 for example, or on the website 133) and specifying them as the target for the new message.

Typically, in a managed group type social group, responses to a message need to go to a manager of group (if there is more than one manager assigned, all managers get the responses). New messages received from any user are communicated to one or more managers of the social group. A manager can respond to whole group—new message from a manager or responses from the manager needs to be sent to the whole group. For example, in one related embodiment, the client app 153 in the user device 141, 143 determines if the user is a manager of a social group (currently selected by user) and sends the message to the whole group. In another embodiment, the server 111 determines if the user posting a message or response is a manager and sends the message to the whole group if the user is determined to be a manager of the current social group.

Typically on the server 111, when a new message is received, the server 111 can choose user's specification of a target, or determine on its own if the target (recipients) is the whole social group (meaning all the members of the social group) or a manager(s) of that social group, etc. In P2P social groups, a sender can choose a subset of members as the target, and therefore the client app 153 in the user device 141 lets the user select multiple recipients (subset of group) only if the group type (specified as the interaction_type field, for example, in a table in the database 121) for that group is P2P. A similar feature of selecting multiple individual members as the target for a message or response is provided when the user is a manager of a social group of type managed group.

Each social group may be associated with a business category, and the users of the server 111 can browse through available categories of social groups in order to locate ones where they are members, or ones where they would like to join. The exemplary categories of social groups: are Agribusiness, Sports, Medicine, Financial, Education, etc.

In some embodiments, social groups can be flagged as "public groups" or "private groups". Public groups are those where any person can join. Private groups are those where there is requirement for joining a group. Such requirements can be prior participation in some activity, prior involvement in a project, prior employment in some business or corporation, current involvement in some business work, etc.

In one embodiment, the server 111 supports "closed box" social groups wherein the membership of each of the social groups is tightly controlled and managed and only individuals who are approved by a business or relevant entity can participate in those groups. For example, a business can establish a specific social group and a manger associated with that business, who is authorized to manage the specific social group, is able to add members, delete members, approve changes to membership, etc. by employing appropriate management webpages provided by the website 133. Such closed box social groups are used to create and manage business related social groups that help in logistics and field operations. For example, social groups created by an agribusiness corporation can handle logistics of contract farming (input delivery, produce collection, etc.) or be used to connect groups of farmers to agribusiness supply chain actors (input suppliers, logistics service providers, buyers (exporters/processors, retailers). Similarly, such closed box social groups provided by the server 111 are used for procurement/management of Fast Moving Consumer Goods (FMCG), for communicating Package of Practices (POP) and technical extension services to farmers in agribusiness, for sharing field observations recorded on mobile and for providing access to expert groups.

In general, an observer member of a social group can only post messages to the manager of the social group. For example, a user who is a member of a first social group and an observer of a second social group can receive messages posted to him by a manager of the second social group or messages forwarded to him by the manager of the second social group. A manager of the first social group can forward a message to the second social group if he is a member of the second social group or an observer of the second social group. If he is a normal member of the second social group and the second social group is a P2P social group, then that forwarded message is communicated to all the members of the second social group. In addition, if the second social group is a managed social group and the manager of the first social group is an observer of the second social group, then the forwarded message is sent only to the manager of the second social group. If, however, he is a normal member or an observer of the second social group and the second social group is a managed social group, then the forwarded message is sent to the manager(s) of the second social group.

A manager of a social group, such as those that manage social groups of type managed group, have operational responsibilities, not just group membership management responsibilities (i.e. adding members, deleting members, etc.). For example, in a social group employed by an agribusiness related organization, a user who is a manager (member type of that user in that specific group being a manager) can assign tasks to other members who are farmers, get field reports from farmers, request harvest yield estimate from individual members who are farmers, gather such harvest yield estimates from all other normal members of that social group so as to aggregate harvest yield across all normal members, etc. Thus, member types assigned to various users (when they join those social groups or when they are assigned social groups, such as by a manager, admin, etc.) in specific social groups often has group specific operational responsibilities. The server 111 supports logistical operations, group specific operational activities, etc. which are coordinated and managed by the managers of those respective social groups.

In one embodiment, when a normal user posts a message to the social group of type managed group, the manager of that social group receives the message, and, in addition, a trouble ticket is automatically generated at the server 111, the id of which is tracked until resolution by the manager. In addition, the trouble ticket is kept "open" until the manager can resolve the issue involved, and the manager can (using the website 133, for example) close the issue and terminate the trouble ticket when the manager is able to resolve the issue. The corresponding user gets a one-to-one message from the manager indicating termination (successful or otherwise) of the issue and the closure of the corresponding trouble ticket. The website 133 enables listing and browsing of all trouble tickets, and subsets thereof (open trouble tickets, closed trouble tickets, etc.). It also supports resolution of trouble tickets with corresponding resolution codes, observations and annotations.

Messages posted by a user may be forwarded to an external server 137, such as a corporate server owned and operated by a corporation (or some external organization/business). The URL or communication link to the external server 137 is identified by the server 111 and the messages are forwarded to the external server 137 as required, typically to initiate an additional step in a work flow or to notify a data processing component that the external server 137 is responsible for conducting. The external server 137 may, in response, provide a response message that is displayed to the entire social group, a subset of the social group, to the sender of the message, or to the manager of the social group, based on policies specified for such interactions, a policy table in the message & information database 121 providing access to stored policies. Similarly, the policy table may store group policies for the various social groups, and may incorporate URLs, links and security credentials to employ for interactions with external server 137.

In general, the messages in the social group are automatically archived and removed from those groups after an expiration threshold (such as 60 days). A manager of a social group can delete messages employing management screen (webpages) provided by the website 133. In managed group type social groups that provide for trouble ticket support, where trouble tickets are automatically created with a status of "open" at the server 111 when a new message is posted, and the trouble tickets are changed to a state of "closed" or "resolved" by a manager subsequently, the messages are removed from the social groups and archived automatically by the server 111 when the trouble tickets states are changed to "closed" or "resolved".

Figure 2:
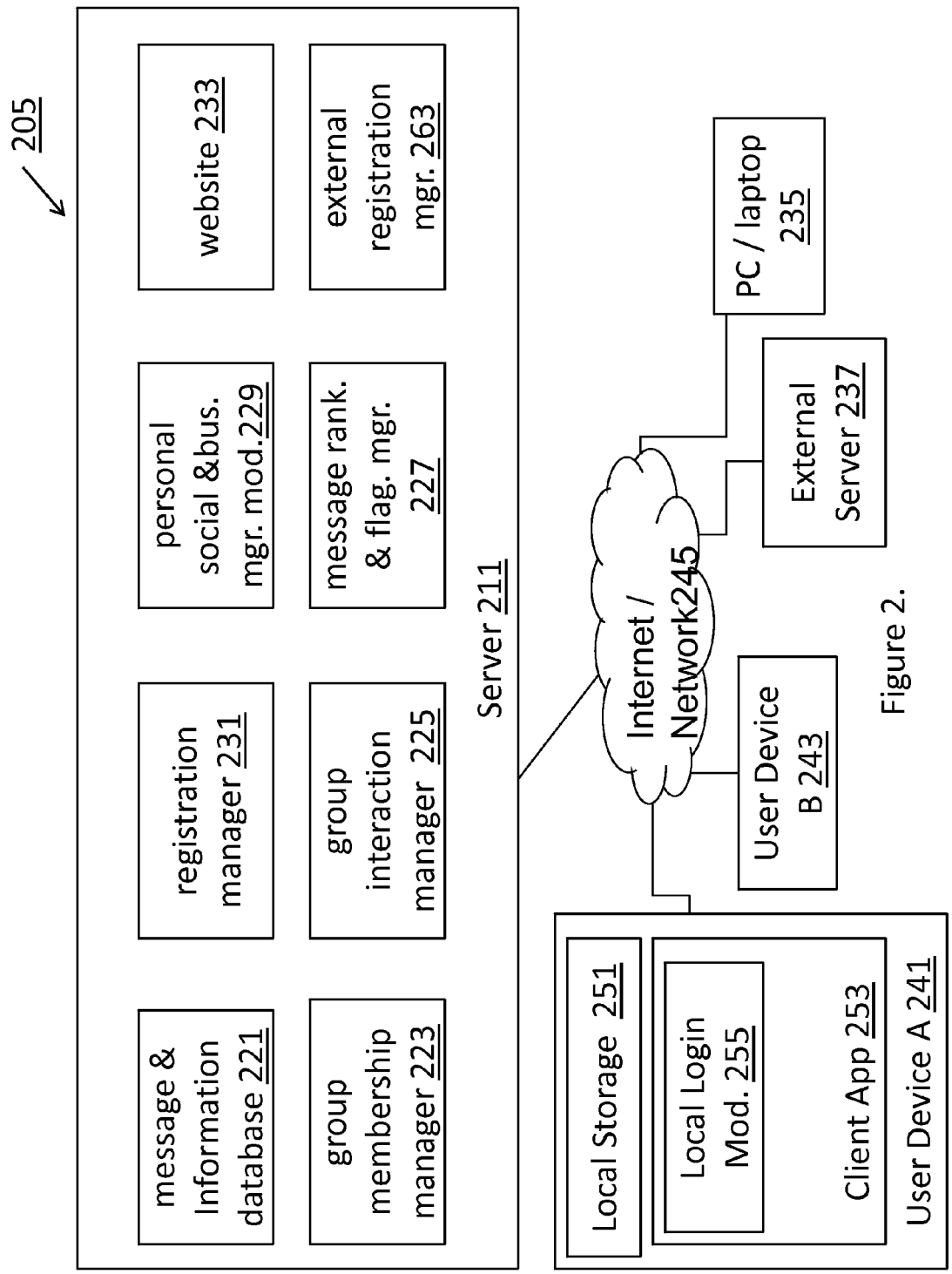
FIG. 2 is a perspective block diagram of a system for managing social group interactions, the system comprising a server that supports creation and management of a plurality of social groups and a plurality of user devices communicatively coupled to the server that is used by a plurality of users.

FIG. 2 is a perspective block diagram of a system 205 for managing social group interactions, the system comprising a server 211 that supports creation and management of a plurality of social groups and a plurality of user devices 241, 243 communicatively coupled over Internet/network 245 to the server 211 that is used by a plurality of users. The server 211 supports the registration of each of the plurality of users as members of one or more of the plurality of social groups. The server saves a list of the plurality of social groups in which the one of the plurality of users is currently a member at the one of the plurality of user devices 241, 243 associated with the one of the plurality of users. For example, if a user using the device 241 is associated with a social group (where he is a member), then the server 241 saves a reference and membership details and even a member list in the user device 241. The member list is typically just a list of references to the other members of that social group, and not any specific phone number or address. For example, a list of names of all the other members of that social group is stored in the user device 241, the server 211 containing other details for those members, such as contact information, phone numbers etc. that may be necessary to interact with the user devices being used by those other members.

In general, each of the plurality of user devices 241, 243 facilitate local login by one of the plurality of users in order to provide access to message based communication and group interaction services (facilitated by the server 211). The user device 241 comprises a client app 253 that interacts with the server 211 to provide the message based communication and group interaction services. It comprises a local login module 255 that makes it possible for a user to attempt a local login first, before a remote login is attempted at the server 211.

The server 211 facilitates login by the one of the plurality of users via the one of the plurality of user devices 241, when a local login attempt facilitated by the one of the plurality of user devices 241 fails. The server facilitating open one-to-many and one-to-one interactions using messages in peer-to-peer type social groups by all members of such social groups after a local login at the user device 241 or a remote login at the server 211 succeeds. The server 211 facilitates controlled one-to-many and one-to-one social interactions by a manager type member using messages while supporting one-to-one social interactions by other types of members using messages in managed group type social groups.

In general, in the system 205, the user device 241 associated with a user retrieves a list of member references for each of the social groups in which that user is currently a member. In a related embodiment, the user device 241 associated with the one of the plurality of users stores the retrieved a list of member references for each of the social groups in which the user is currently a member in a removable storage device, or in a programmed card such as a SIM card, plugged into and communicatively coupled to the user device 241.

In general, each of the messages and any individual response to the messages comprises at least one of a textual component, an audio component, a digital image component, a video component, a GPS coordinate component, an IP address component, a sales offer component, an advertisement component, a security information component and an encrypted secure data component.

The server 211 also comprises a personal social & business manager module 229 that facilitates management of membership data related to the membership of the one of the plurality of individuals in one or more of the managed social groups. It also help manage membership in other external public social groups, with the help of the external registration manager 263. The personal social & business manager module 229 facilitates interactions by the one of the plurality of individuals in the one or more of the managed social groups, employing the membership data (that is selectively stored in a message and information database 221 in the server).

In one related embodiment, the personal social & business manager module 229 is part of the corresponding user device 241. For example, it is part of the mobile phone 241 used by a user who is a member of one of the social groups. In another embodiment, it is part of an electronic device communicatively coupled to the corresponding user device (such as a PC/laptop 235 or tablet), wherein the electronic device is capable of storing and/or managing the membership data of the user (the groups that user is a member of, the security credentials for those groups, the expiry date of membership, etc.). In another embodiment the personal social & business manager module 229 is part of the server 211.

In general, the group interactions managed by the server 211 incorporate the features and functionality provided by the personal social & business manager module (wherever it is located). The user can "own", and manage the membership information in one or more social groups, including membership in external social groups that are external to the server 211. The user can control access to his membership information just as he controls and manages his credit card information. The user can request membership to new social groups and track subscription information. The user can download social group membership lists and store them locally and use them to send messages to a set of individual members (rather than t the whole social group), as necessary. He can create adhoc groups of such subsets of members of a social group.

The server 211 supports arranging for a coordinated participation in an online activity such as a coordinated TV program viewing (or a coordinated viewing of a live streamed video program) by all the members of one of the managed social groups. In general, the online activity is one of an online multi-player game with members of the one of the managed social groups participating, viewing a TV show as a group activity, a special viewing of a movie arranged exclusively for the members one of the managed social groups, a special educational activity coordinated for the members one of the managed social groups and an interactive media viewing group activity.

In one embodiment, when a user logs in to server 211 from his user device 241, the server 211 retrieves a list of groups that the use is currently a member in, and send that list of groups (along with associated summary information such as max number of recent/unread messages, etc.) to save in the user device 241 (or a client app 253 in the user device 241), such that is accessible by a client app 253 in the user device 241 that communicates with the server 211. The server 211 also sends group type (P2P or managed) for all these groups in the list of groups, along with some user account details such as userid, subscription summary, etc. The server 211 also sends determines and sends a member type for each of the groups where user is a member—so that client app 253 can determine if user if a manager or an ordinary member or observer, without having to contact the server 211. The client app 253 is capable of saving the list of groups and other related information sent by the server 111 in the user device 241, and is capable of using it for "local login" and user message creation, thereby reducing interactions of the client app 241 with server 111 (that slow the user experience down typically or add to the server 241 load).

The server 211 facilitates controlled one-to-many and one-to-one social interactions by a manager type member of a social group using messages. In one embodiment, the controlled sending of messages requires the server to receive a new message (or a response) from the user device 241, 243, determining if the social group is a P2P type or managed group type of social group, determining if the user has a member type of manager, normal user or observer, determining if the user has specified a list of individual recipients (after having selected them)—based on all of these determinations, the server 111 conducts a one-to-many (as in the case of a manager of a managed social group, or as in the case of a P2P social group) social interaction or a one-to-one interaction (as in the case of a normal user posting a message in a managed social group).

The user devices 241, 243 as well as the website 233 facilitate viewing of messages and creation of messages posted to the social groups. In particular, a client app 253 in the user devices 241, 243 is responsible for access to the social groups and display of appropriate screens of information and prompts that comprise user experience and provide for user interactions. The client app 253 makes use of local storage 251 to store local login information used by the local login module 255. It also stores configuration information and user preferences, in addition to membership lists (list of references to members) for the various social groups the user is currently subscribed to or associated with. The user can initiate the download of member list for the social groups (and updates to them) whenever the user wants to download them, from the user devices 241, 243 for local storage in the user devices 241, 243. The client app 253 is capable of displaying messages in a list form or in a tree form with thread based grouping of messages, and switching between the two formats upon user request. In addition, the tree format of message display for one of the social groups is such that the threads are used to collect messages that are related, such as all responses to an original message making an inquiry or asking a question.

Thus, the present invention supports displaying, employing a thread based tree format, a set of messages associated with one of the managed social groups, wherein the set of messages are retrieved in chronological order (other orders of data retrieval and display are also contemplated) from the server and dynamically organized into threads by the client app 253 in the corresponding user devices 241, 243 associated with the members of one of the managed social groups (or by the appropriate webpages in the website 233). When a thread of messages (the user can expand a thread to view the individual messages and responses) is presented to a user, the user can request additional messages from that same thread, and these additional messages from the same thread (older ones) will be retrieved from the server 211 and displayed to the user. Thus, messages are grouped and displayed by threads, and rather than threads that are older (with no new messages) showing up, only those threads that have messages/responses posted to them more recently will be retrieved and shown to the user. Thus enforcing threads over chronologically retrieved data is an innovation that is good for user experience and an efficient way to present data/messages to a user.

One unique way in which the thread-based display of messages in a tree format is conducted in the user devices 241, 243 by the corresponding client apps 253, as well as by the website 233, in the present invention, employs a combination of chronological order and thread related grouping of messages and responses. This has several advantages over the more traditional thread based display of emails and other data, in that old less relevant messages that tend to clutter the space (which is very limited and at a premium in small screen user devices such as mobile phones) are eliminated automatically from being displayed by the chronological order enforced for retrieval of messages from the server 211 in groups of 20 messages (or some such set size/chunk size). For example, if a first batch of 20 messages for a social group is retrieved for display in the user device 241, the client app 253 processes the retrieved group of messages to sort them by an original message identification (for example, the original message id is used to determine a thread for the messages) to group them under separate threads. Thus, even if hundreds of threads of messages are available at the server 211, the current set of 20 (or some such sized set) messages may incorporate only 3 threads of messages, and a tree of messages comprising 3 entries or three expandable nodes is displayed to the user in an appropriate screen by the client app 253 (and by a webpage in the website 233 too). Additional groups of 20 messages (configurable set size) can be retrieved by a user by activating a "next" button or menu item, and the next set of messages are retrieved from the server 211 and processed by the client app again to organize them under relevant threads (within the context of that current batch of messages retrieved).

FIG. 3 is a flow chart of an exemplary operation conducted by a server 211 in managing interaction in social groups supported by the server 211. At a block 305 the operation starts when the server is ready to receive user requests, messages or responses. Then, at a next block 307, the server creates one or more managed social groups at the server based on anticipated participation by a plurality of individuals in a group activity, wherein each of the managed social groups comprises at least a group name, a group identification, a group type, a group category, a region identification, an organization identification, a primary group manager and an interaction type. Then, at a next block 309, the sever provides a user profile for each of the plurality of individuals at the server, wherein user profile comprises at least a user identification, a contact information, personal preferences information, status, category receiving mode, subscription type, default social group identification, a user type, and a default friends list identification. The user profiles are those stored at the server by a user, or those retrieved by the user from a user device (in accordance with user request) or from an external system (such as an external social network).

At a next block 311, the server registers the plurality of individuals (such as new users subscribing to specific social groups) to appropriate ones of the managed social groups at the server by maintaining a group-user mapping comprising the group identification, the user identification, a status and a member type. Member type can be manager, normal user, observer, admin, etc. Group-user mapping can be stored in several different ways, such as records in a "group_user" table in a database at the server. For each adhoc list made by a user, an adhoc group may be setup at the server with mapping of users to those adhoc groups.

At a next block 313, the server controls access to group interaction services by employing a login activity wherein each of the plurality of individuals attempt a local decentralized login on a corresponding user device communicatively coupled to the server before attempting a centralized login at the server. Then, at a next block 315, the server facilitates posting of messages to the managed social groups by the user who has logged in. selectively a one-to-one or one-to-many new message each of the plurality of individuals, wherein each of the plurality of individuals employ their corresponding user device.

In one embodiment, the step of posting a new message comprises determining if the new message created by one of the plurality of individuals on the corresponding user device is to be communicated to all the members of one of the managed social groups, communicated to a subset of the members of one of the managed social groups, communicated to one or more managers of the one of the managed social groups, or communicated to a manager of a second one of the managed social groups. Thus, the target for the new message is determined by the server. In addition, in a related embodiment, while posting a new message the user is asked to optionally provide a message category and a message issue type. For example, the server solicits a message category for selection by the one of the plurality of individuals on the corresponding user device during the creation of a new message. It presents a related message issue list for user selection based on the user's selection of a message category. The user can then select a message issue. Often a given message category has a specific set of related issues and needs to be presented to the user for selection. Once the user has provided a message category and an associated message issue, the server collects the new message (from the corresponding user device), the selected message category, the selected message issue, an urgency indicator, an optional recipient list, the user identification, and the group identification. It can then store or disseminate that new message for the target(s) selected.

In general, the new message is created by each of the plurality of individuals on the corresponding user device employing a client software/client app that facilitates entry of text, taking a digital photo, taking a video clip, recording voice audio, capturing GPS coordinates and selection of a list of recipients. The server collects the new message from the client software/client app, stores it and communicates to one of the managed social groups or a subset thereof.

At a next block 317, users can pay for the group interaction services supported by the server. The server supports payment for the group interactions in at least one of the managed social groups by the one of the plurality of individuals. For example, an organization in charge of providing a product or service subsidizes interactions in one (or more) of the managed social groups and pays at least a portion of charges incurred by the one of the plurality of individuals. Thus a business can sponsor the membership of a whole group of people in a managed social group or a peer-to-peer social group and pay the subscription charges or usage charges for all the member of that social group or for a subset of members of that social group.

Then, at a next block 319, the server supports uploading of a list of new members for at least one of the managed social groups by an organization in charge of providing a product or service. For example, the list of new members constitutes new users for whom the organization is willing to sponsor or subsidize.

Then, at a next block 321, the server supports coordinated participation in an online activity by members (all or some members) of a social group. For example, it supports arranging for a coordinated participation in an online activity such as a coordinated TV program viewing (or a coordinated viewing of a live streamed video program) by all the members of one of the managed social groups. In general, the online activity is one of an online multi-player game with members of the one of the managed social groups participating, viewing a TV show as a group activity, a special viewing of a movie arranged exclusively for the members one of the managed social groups, a special educational activity coordinated for the members one of the managed social groups and an interactive media viewing group activity.

In one embodiment, the server is also responsible for (and capable of) arranging a coordinated participation of members of a social group in a collective purchase activity. For example, the server can arrange the purchase of a product or service available for purchase (or for subscription of a service) by all the members of one of the managed social groups.

At a next block 323, the server, employing a personal social and business manager module, facilitates management of membership data related to the membership of the one of the plurality of individuals in one or more of the managed social groups as well as membership in other external public social groups. It also facilitates interactions by the one of the plurality of individuals in the one or more of the managed social groups, employing the membership data, wherein such interactions are one-to-one, one-to-many in a P2P type of social group, or user-to-manager interactions or manager to whole group interactions in managed group type social groups. In one related embodiment, the personal social & business manager module is part of the corresponding user device, part of an electronic device communicatively coupled to the corresponding user device, or part of the server, and the group interactions incorporate the features and functionality provided by the personal social & business manager module.

The operation finally terminates at the end block 331.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above in terms of social groups. The term social groups, as may be used herein, include social networks, groups of users interacting over the Internet, groups in mailing lists and groups formed other commercially available social media networks. In general, a social group is defined as two or more humans who interact with one another and send messages to each other employing Internet based technologies, cellular communication means, etc. More specifically, it includes groups formed by business, enterprises, employees of businesses, customers of businesses and Internet communities.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system for managing social group interactions, the system comprising:
   a server that supports creation and management of a plurality of social groups;
   a plurality of user devices communicatively coupled to the server that is used by a plurality of users;

the server supporting the registration of each of the plurality of users as members of one or more of the plurality of social groups;

the server saving a list of the plurality of social groups in which the one of the plurality of users is currently a member at the one of the plurality of user devices associated with the one of the plurality of users;

each of the plurality of user devices facilitating local login by one of the plurality of users in order to provide access to message based communication services;

the server facilitating login by the one of the plurality of users via the one of the plurality of user devices, when a local login attempt facilitated by the one of the plurality of user devices fails;

the server facilitating open one-to-many and one-to-one interactions using messages in peer-to-peer type social groups by all members of such social groups; and the server facilitating controlled one-to-many and one-to-one social interactions by a manager type member using messages while supporting one-to-one social interactions by other types of members using messages in managed group type social groups;

wherein the one of the plurality of user devices retrieves and stores the retrieved list of member references for each of the list of the plurality of social groups in which the one of the plurality of users is currently a member in a removable storage device, in a programmed card or a SIM card, plugged into and communicatively coupled to the one of the plurality of user devices; and wherein each of the messages and individual response to the messages comprises a textual component, an audio component, a digital image component, a video component, a GPS coordinate component, an IP address component, a sales offer component, an advertisement component, a security information component and an encrypted secure data component.

2. The system of claim 1 wherein the one of the plurality of user devices associated with the one of the plurality of users retrieves and locally stores a list of member references for each of the list of the plurality of social groups in which the one of the plurality of users is currently a member.

3. A server that supports social group interactions, the server comprising:

a group membership manager that facilitates creation of a plurality of social groups and the management of the members of the plurality of social groups, wherein each of the plurality of social groups is assigned one or more group managers;

a registration manager that manages a member profile for members of the plurality of social groups, wherein the member profile comprises:

a contact information;

a user type indicating a role, wherein the role comprises an administrative role and a normal user role;

a subscription type that is one of a prepaid, postpaid; a status that is one of active, inactive and closed; and a receiving mode indicating web access, mobile based access to messages;

a group interaction manager that manages interaction by members of the plurality of social groups employing their corresponding user devices, wherein the corresponding user devices are communicatively coupled to the server, and wherein each of the plurality of social groups are assigned an associated social group interaction type;

the group interaction manager managing one-to-one interactions and one-to-many interactions within each of the plurality of social groups, wherein the interactions comprise sending and receiving messages by the members of the each of the plurality of social groups;

the group interaction manager managing creation and dissemination of responses by the recipients of the messages communicated in the one-to-one interactions and the one-to-many interactions within each of the plurality of social groups;

the group interaction manager also facilitating a default mode communication of a new message by one member of one of a plurality of social groups to all the other members of the one of a plurality of social groups when the group interaction type associated with the one of a plurality of social groups is a peer-to-peer group;

the group interaction manager facilitating another default mode communication of a new message by one member of one of a plurality of social groups to only the group managers of the one of a plurality of social groups when the group interaction type associated with the one of a plurality of social groups is a managed group and the user type associated with the one member is regular;

the group interaction manager facilitating communication of a new message by one member of one of a plurality of social groups to all the members of the one of a plurality of social groups when the group interaction type associated with the one of a plurality of social groups is managed group and the user type associated with the one member is manager; and wherein the new message and response to the new message comprises a textual component, an audio component, a digital image component, a video component, a GPS coordinate component, an IP address component, a sales offer, a security information and an encrypted secure data.

4. The server of claim 3 wherein the group interaction manager facilitates creation and sharing of a response message, referencing the new message, by at least one of the other members of the one of a plurality of social groups, in response to the new message by the one member.

5. The server of claim 3 wherein the group interaction manager also facilitates forwarding of the new message by one of the other members of the one of a plurality of social groups to another one of the plurality of social groups, in response to the new message sent by the one member.

6. The server of claim 3 wherein the group interaction manager facilitates creation of adhoc social groups and interaction between members of the adhoc social groups.

7. The server of claim 3 wherein each of the plurality of social groups comprise:

one or more members, each of the one or more members have a corresponding profile registered with the server;

a group name;

at least one of the one or more members identified as a group manager;

an optional region identification;

a group category identifying a vertical market or a business category;

an optional organization affiliation; and the group interaction type, wherein the group interaction type is peer-to-peer or managed.

8. The server of claim 7 wherein the group membership manager manages the membership data of the plurality of social groups, wherein the members of the plurality of social groups are assigned a member type for each of the plurality of social groups in which they are members, wherein the member type is one of an admin, group manager, regular member and observer.

9. The server of claim 3 wherein the registration manager stores a copy of the member profile for members of the plurality of social groups in their corresponding user devices or in a corresponding secure storage units, along with a list of those of the plurality of social groups in which the member is a member.

10. The server of claim 3 wherein the corresponding user devices is one of a TV, a personal computer, a set-top-box, a gaming console, a mobile phone, a tablet device, a media server and a WiFi router.

11. The server of claim 3 wherein the server stores, categories and manages messages that are flagged as recommendations by members of the plurality of social groups.

12. A method of managing interaction in social groups supported by a server, the method comprising:
creating managed social groups at the server based on anticipated participation by a plurality of individuals in a group activity, wherein each of the managed social groups comprises at least a group name, a group identification, a group type, a group category, a region identification, an organization identification, a primary group manager and an interaction type;
providing a user profile for each of the plurality of individuals at the server, wherein the user profile comprises at least a user identification, a contact information, personal preferences information, status, category receiving mode, subscription type, default social group identification, a user type, and a default friends list identification;
registering the plurality of individuals to appropriate ones of the managed social groups at the server by maintaining a group-user mapping comprising the group identification, the user identification, a status and a member type;
controlling access employing a login activity wherein each of the plurality of individuals attempt a local decentralized login on a corresponding user device communicatively coupled to the server before attempting a centralized login at the server;
posting selectively a one-to-one or one-to-many new message to the managed social groups by each of the plurality of individuals, wherein each of the plurality of individuals employ their corresponding user device; and
managing, by a personal social and business manager module, membership data related to the membership of the one of the plurality of individuals in one or more of the managed social groups as well as membership in other external public social groups; and
facilitating, by the personal social and business manager module, interactions by the one of the plurality of individuals in the one or more of the managed social groups, employing the membership data; and
wherein the personal social and business manager module is part of the corresponding user device, part of an electronic device communicatively coupled to the corresponding user device, or part of the server;
displaying messages and responses selectively employing a list format or a thread-based tree format, wherein the thread-based tree format presents a set of messages and responses organized as a plurality of expandable threads, wherein such organization is dynamically conducted by processing a current set of messages and responses that are retrieved from the server in a chronological order.

13. The method of claim 12 wherein posting comprises:
determining if the new message created by one of the plurality of individuals on the corresponding user device is to be communicated to all the members of one of the managed social groups, communicated to a subset of the members of one of the managed social groups, communicated to one or more managers of the one of the managed social groups or communicated to a manager of a second one of the managed social groups.

14. The method of claim 13 further comprising:
soliciting, a message category for selection by the one of the plurality of individuals on the corresponding user device during the creation of a new message and presenting a related message issue list for user selection based on the user's selection of a selected message category in order to solicit a selected message issue; and
collecting by the server the new message created, the selected message category, the selected message issue, an urgency indicator, an optional recipient list, the user identification, and the group identification from the corresponding user device.

15. The method of claim 12 wherein the new message is created by each of the plurality of individuals on the corresponding user device employing a client software that facilitates entry of text, taking a digital photo, taking a video clip, recording voice audio, capturing GPS coordinates and selection of a list of recipients, wherein the server collects the new message from the client software, stores it and communicates to one of the managed social groups or a subset thereof.

16. The method of claim 15 further comprising:
paying for the interactions in at least one of the managed social groups by the one of the plurality of individuals, wherein an organization in charge of providing a product or service subsidizes interactions in the at least one of the managed social groups and pays at least a portion of charges incurred by the one of the plurality of individuals.

17. The method of claim 16 further comprising:
uploading a list of new members for at least one of the managed social groups by an organization in charge of providing a product or service, wherein the list of new members constitutes new users for whom the organization is willing to sponsor or subsidize.

18. The method of claim 15 further comprising:
arranging for a coordinated participation in an online activity by all the members of one of the managed social groups, wherein the online activity is one of an online multi-player game with members of the one of the managed social groups participating, viewing a TV show as a group activity, a special viewing of a movie arranged exclusively for the members one of the managed social groups, a special educational activity coordinated for the members one of the managed social groups and an interactive media viewing group activity.

19. The method of claim 15 further comprising:
displaying employing a thread based tree format, a set of messages associated with one of the managed social groups, wherein the set of messages are retrieved in chronological order from the server and dynamically organized into threads by a client app in the corresponding user devices associated with the members of one of the managed social groups; and
arranging for a coordinated participation in a collective purchase activity by all the members of one of the managed social groups for a product or service available for purchase.

* * * * *